United States Patent [19]
Tanigawa

[11] Patent Number: 5,454,450
[45] Date of Patent: Oct. 3, 1995

[54] WEAR DETECTION PROBE WITH A WIRE FALLING OUT PREVENTION MEMBER

[75] Inventor: Fumiyoshi Tanigawa, Yokkaichi, Japan

[73] Assignee: Sumitomo Wiring Systems, Ltd., Yokkaichi, Japan

[21] Appl. No.: 187,004

[22] Filed: Jan. 27, 1994

[30] Foreign Application Priority Data

Feb. 8, 1993 [JP] Japan ................. 5-009017 U

[51] Int. Cl.⁶ .................................................. F16D 66/02
[52] U.S. Cl. ..................... 188/1.11; 200/61.4; 73/129; 340/454
[58] Field of Search ................. 188/1.11 OR; 340/454; 200/61.4; 192/30 W; 73/121, 129

[56] References Cited

U.S. PATENT DOCUMENTS

| | | | |
|---|---|---|---|
| 4,016,533 | 4/1977 | Ishikawa et al. | 340/454 W |
| 4,318,457 | 3/1982 | Dorsch et al. | 188/1.11 |
| 5,015,990 | 5/1991 | Reede | 188/1.11 X |
| 5,307,673 | 5/1994 | Ito et al. | 340/454 X |

FOREIGN PATENT DOCUMENTS

| | | | |
|---|---|---|---|
| 0546759 | 6/1993 | European Pat. Off. | 188/1.11 |
| 2450979 | 10/1980 | France . | |
| 2648528 | 12/1990 | France . | |
| 2663703 | 12/1991 | France . | |
| 9215810 | 1/1993 | Germany . | |
| 50-24982 | 6/1973 | Japan . | |
| 62-97332 | 6/1987 | Japan . | |
| 3-110226 | 11/1991 | Japan . | |

*Primary Examiner*—Josie A. Ballato
*Attorney, Agent, or Firm*—Wenderoth, Lind & Ponack

[57] ABSTRACT

A probe for detecting wear of a lining such as a brake pad in automobiles includes a holder having two insertion apertures and a notch. An electrically conducting wire is inserted through the insertion apertures of the holder. Portions of the wire positioned in the notch are secured to a fallout preventing member. Upon the progressive wear of the lining, a U-shaped portion of the wire is severed by a rotor of the brake system. The fallout preventing member prevents the wire from falling out of the holder once the wire has been severed. The portions of the wire remaining after the wire has been severed by the rotor can thus be prevented from twining around the rotor or the like.

12 Claims, 4 Drawing Sheets

WEAR DETECTION PROBE WITH A WIRE FALLING OUT PREVENTION MEMBER

BACKGROUND OF THE INVENTION

1. Field of the Invention

This invention relates to a probe for detecting wear of a lining such as a brake pad employed in a disc brake of an automobile.

2. Description of the Related Art

A probe for detecting wear of a brake pad of an automobile is known in the art. In such a probe, a U-shaped electrical conducting wire is held by a holder. The probe is brought into contact with a rotor when a predetermined residual amount of a lining is left as the result of wear. Consequently, the conducting wire is severed by the rotor at its U-shaped end.

More specifically, two apertures each extend axially through a generally cylindrical holder formed of a synthetic resin. The conducting wire is folded to assume a U-shape and then, both ends of the conducting wire are inserted through the respective apertures from the front end of the holder. A fixing member is secured to the conducting wire at the rear end of the holder.

In the probe as described above, the U-shaped portion of the conducting wire is brought into contact with the rotor upon the progressive wear of the lining until the conducting wire is severed at the U-shaped portion thereof. The accuracy of the detection would be compromised if the U-shaped folded portion of the conducting wire were allowed to move or if the U-shaped portion were deformed. In order to prevent the U-shaped folded portion from being displaced during operation; the fixing member is secured to the conducting wire while the wire is drawn rearwardly in this holder under tension. Once applied, the fixing member prevents the U-shaped portion of the conducting wire from moving forwardly toward the rotor. Rearward movement of the U-shaped portion away from the rotor is prevented by the engagement of the U-shaped portion with the front surface of the holder.

However, the conducting wire is allowed to move rearward relative to the holder when the U-shaped portion of the conducting wire is severed by the rotor. In fact, there is a possibility that the two remaining portions of the severed conducting wire fall out of the holder. In this case, the portions of the conducting wire can twine around the rotor or an axle of the automobile giving rise to obvious problems.

SUMMARY OF THE INVENTION

Therefore, an object of the present invention is to provide a wear detecting probe wherein the conducting wire is prevented from falling out of the holder when the conducting wire has been severed indicating wear of the lining.

Another object of the invention is to provide a wear detecting probe wherein the holder thereof can be accurately positioned with respect to the lining, the wearing of which is to be detected.

To achieve these objects, the present invention provides a probe for detecting wear of a lining, comprising a holder having at least two insertion apertures formed therein and a notch dividing each insertion aperture into front and rear portions. The notch is open at an outer peripheral surface of the holder. The holder is mounted to the lining with the insertion apertures extending in the direction of the thickness of the lining. An electrical conducting wire has a folded portion at a distal end of the holder and two ends extending through the insertion apertures of the holder, respectively. The folded portion of the conducting wire protrudes beyond the front surface of the holder so as to be exposed. A falling-out preventing member is secured to the conducting wire in the notch.

Forward movement of the conducting wire relative to the holder is prevented by the falling-out preventing member secured to the conducting wire in the notch. Rearward movement of the conducting wire is prevented by its U-shaped portion engaged with the front surface of the holder. Consequently, the U-shaped portion of the conducting wire cannot be moved forward or rearward relative to the holder. In this state, the U-shaped portion of the conducting wire is worn down by the rotor of the brake mechanism or the like and severed when a predetermined residual amount of the lining is left, whereby the wear of the lining is detected. Because each of the severed portions of the conducting wire is secured to the falling-out preventing member, the conducting wire cannot fall out of the holder.

The falling-out preventing member may comprise a piece of sheet metal crimped to two portions of the conducting wire positioned in the insertion apertures, respectively. Alternatively, the falling-out preventing member may comprise a block of resin filling the notch(es) of the holder, the resin block covering the portions of the conducting wire positioned in the notch(es) and the resin block being integrated with the holder.

The holder may include a flange formed at its proximal end. When the flange is mounted on a support on which the lining is mounted, the holder is accurately positioned relative to the lining.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENT

Figure 10:
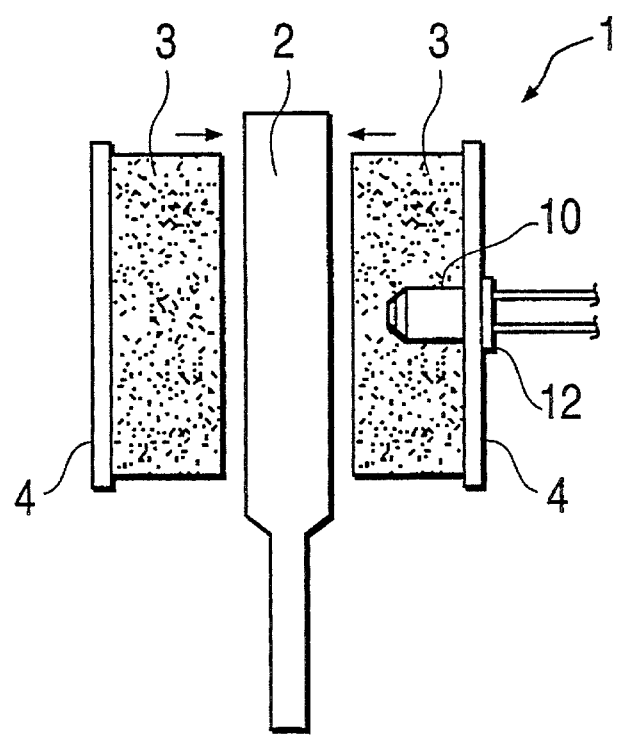
FIG. 10 is a schematic diagram of a disc brake of an automobile provided with the probe of the present invention.

A first embodiment of the present invention will be described with reference to FIGS. 1–6 and 10. In the first embodiment, a probe 10 is applied to an automobile disc brake 1 in which opposite faces of a disc-shaped rotor 2 rotating with a wheel are held and pressed by linings or brake pads 3, as shown in FIG. 10. The brake pads 3 are secured to a support 4 and the probe 10 is also secured thereto in parallel with the brake pads. A front surface of the probe 10 is brought into contact with the rotor 2 when the thickness of the brake pad 3 is reduced upon a progressive wear thereof and reaches a predetermined value, whereupon the wear of the brake pad 3 is detected as will be described in more detail later on.

The structure of the probe 10 will now be described. The probe 10 comprises a holder 11, an electrical conducting wire 20 and a falling-out preventing member 25. The holder 11 is formed of an electrically insulative synthetic resin and has a generally cylindrical shape. The holder 11 has a flange 12 at its rear (proximal) end. The holder 11 is mounted on the brake pad 3 with its front surface opposed to the rotor 2. The holder extends through the support 4 on which the brake pad 3 is mounted and the flange 12 is engaged with the support 4. In this state, the holder 11 is positioned with respect to the support 4 by the contact of the flange 12 with the support 4.

Two parallel, slender insertion apertures 13 extend through the holder 11 in the direction of thickness of the brake pad 3. Each of these apertures opens to the front and rear surfaces of the holder 11. The holder has a rounded (gently curved) surface at the front end thereof which extends between the apertures and defines a portion of the front end of each of the apertures. A notch 15 extends through a middle portion of the holder 11 in a direction perpendicular to the direction in which the insertion apertures extend. The notch 15 is open at the outer peripheral surface of the holder 11. Each insertion aperture 13 is divided by the notch 15 into front and rear portions (on opposite sides of the notch). The holder 11 has two openings in a front inner surface thereof defining a front end of the notch and two openings in a rear inner surface thereof defining a rear end of the notch. The openings in the front inner surface of the holder are contiguous with the insertion apertures 13, respectively, and the openings in the rear inner surface are also contiguous with the insertion apertures 13, respectively.

Figure 1:
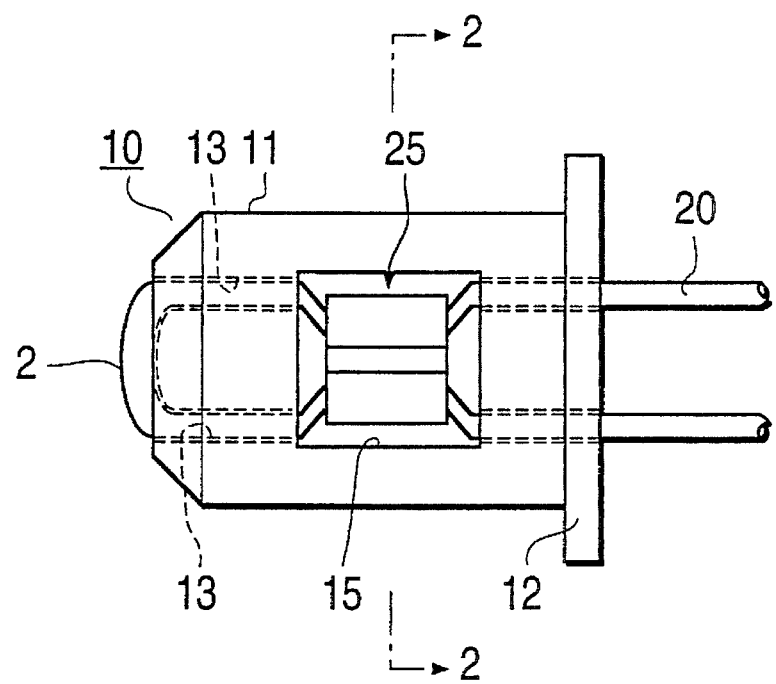
FIG. 1 is a side view of a first embodiment of a wear detecting probe in accordance with the present invention.
Figure 2:
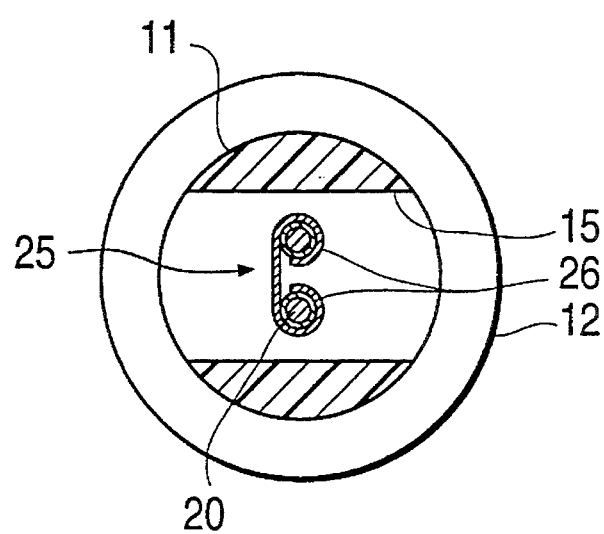
FIG. 2 is a sectional view of the probe taken along line 2—2 in FIG. 1.
Figure 3:
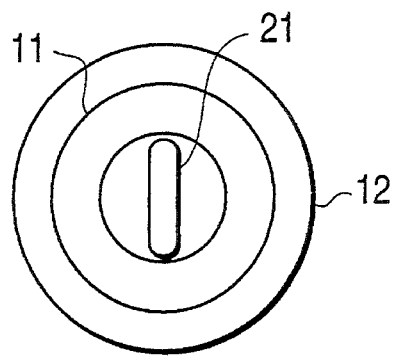
FIG. 3 is a front view of the probe.
Figure 4:
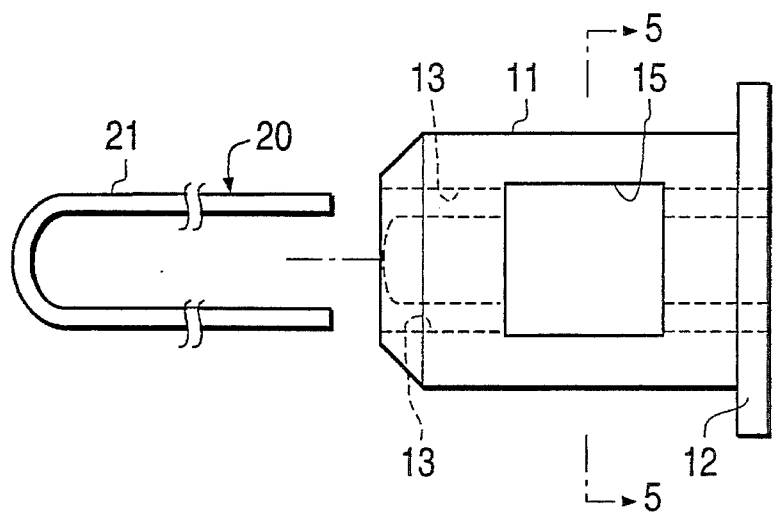
FIG. 4 is a side view of the probe prior to assembly.
Figure 5:
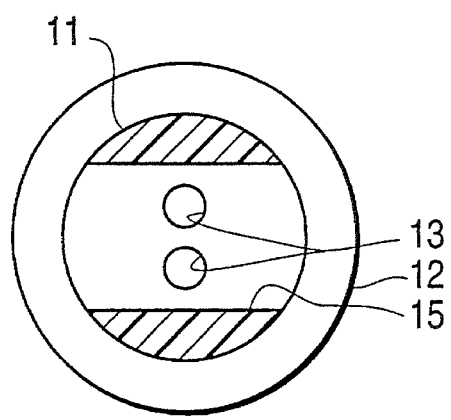
FIG. 5 is a sectional view taken along line 5—5 in FIG. 4.
Figure 6:
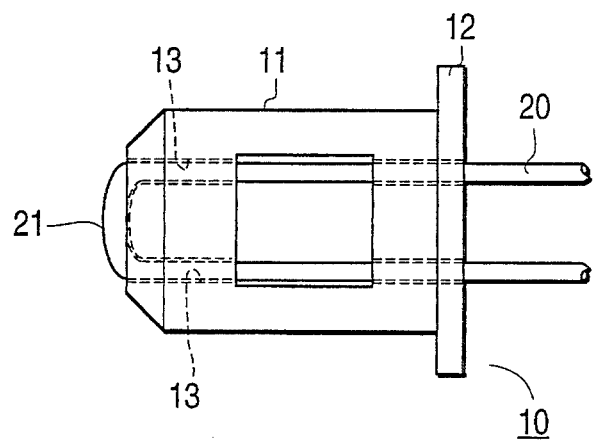
FIG. 6 is a side view of the probe during its assembly.

An insulating coating, such as fluoresin exhibiting superior heat resistance, is applied on the outer periphery of a conducting wire 20. The central portion 21 of the conducting wire 20 is U-shaped. The U-shaped portion 21 of the conducting wire 20 serves as a wear detecting section. Both ends of the conducting wire 20 are inserted into and non-fixedly mounted in the respective insertion apertures 13 from the front of the holder 11 and are then passed through the notch 15, as shown in FIG. 4. The conducting wire 20 is then caused to extend out from the rear end surface of the holder 11. The U-shaped portion 21 of the conducting wire 20 is caused to abut against the front end surface of the holder 11 such that it protrudes from the holder at the front end surface (distal end) of the holder 11 toward the rotor 2, as shown in FIG. 6.

The ends of the conducting wire extending out from the rear end surface of the holder 12 are connected to a known warning circuit (not shown) which will issue a warning that the brake pad 3 has been worn when the conducting wire 12 is severed by contact with the rotor 2.

The falling-out preventing member 25 comprises a piece of sheet metal. The falling-out preventing member 25 has two cylindrical fitting portions 26 formed by caulking opposite curve sides of the sheet metal. The falling-out preventing member 25 has a configuration similar to that of a splice terminal usually used for connecting two wires. The fitting portions 26 of the falling-out preventing member 25 are crimped to the respective portions of the conducting wire 20 positioned in the notch 15 such that the falling-out preventing member 25 is integrally secured to the conducting wire 20. Consequently, the portions of the conducting wire 20 positioned in the notch 15 are forced to come close to each other. As the result of the securing of the falling-out preventing member 25 to the conducting wire as described above, the conducting wire 20 is tensioned between each of its portions secured to the falling-out preventing member 25, i.e. in the notch, and the U-shaped portion 21. Since the U-shaped portion 21 is in contact with the front end surface of the holder 11, rearward movement of the conducting wire 20 relative to the holder 11 is prevented. Furthermore, since the falling-out preventing member 25 secured to the ends of the conducting wire 20 positioned in the notch 15 abuts against the aforementioned front inner surface of the notch 15, forward movement of the conducting wire 20 relative to the holder 11 is prevented.

The operation of the probe 10 will now be described. As mentioned above, the conducting wire 20 is tensioned between each of its portions secured to the falling-out preventing member 25 and the U-shaped portion 21. Consequently, the conducting wire 20 is prevented from moving forward and backward relative to the holder 11. Furthermore, since the flange 12 of the holder 11 is mounted on the support 4, the holder 11 can be accurately positioned without being inclined. Accordingly, the U-shaped portion 21 is accurately positioned with respect to the rotor 2 of the disc brake. A space between the U-shaped portion 21 of the conducting wire 20 and the rotor 2 is reduced with the progressive wear of the brake pad 3 due to the braking operation. The U-shaped portion 21 is eventually brought into contact with the rotor 2. Subsequently, the U-shaped portion 21 is ground by the rotor 2 upon further wearing. The U-shaped folded portion 21 is severed when a predetermined residual amount of the brake pad 3 is left, whereby electrical conduction through the wire 20 is interrupted. The warning circuit is activated upon this interruption. In this case, since the U-shaped portion 21 of the conducting wire 20 is accurately positioned, the amount of wear of the brake pad 3 can be accurately detected.

The conducting wire 20 can move backward when cut into two parts as described above. However, its portions in the notch 15 are still secured to the falling-out preventing member 25. Even if the conducting wire 20 is pulled backward, the falling-out preventing member 25 abuts the rear inner surface of the holder defining the rear end of the notch 15, thereby preventing the conducting wire 20 from falling out of the holder 11. Thus, the conducting wire 20 and the falling-out preventing member 25 are prevented from coming into contact with or twining around the rotor or the axle of the automobile. Consequently, the wear detecting and other parts can be reliably prevented from being damaged.

Although the conducting wire 20 which is to be cut into two portions is secured to a single falling-out preventing member 25 in the foregoing embodiment, two portions of the conducting wire 20 may be secured to discrete falling-out preventing members, respectively. Furthermore, two notches and two falling-out preventing members may be provided.

Figure 7:
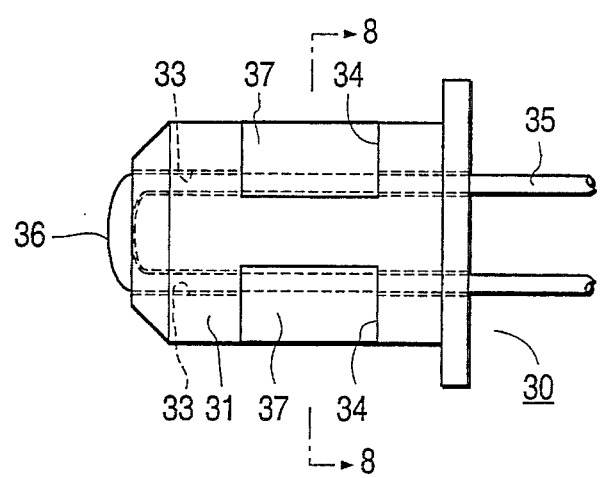
FIG. 7 is side view of a second embodiment of a probe in accordance with the present invention.
Figure 8:
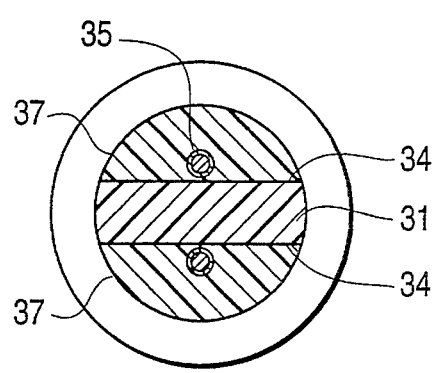
FIG. 8 is a sectional view of the probe taken along line 8—8 in FIG. 7.
Figure 9:
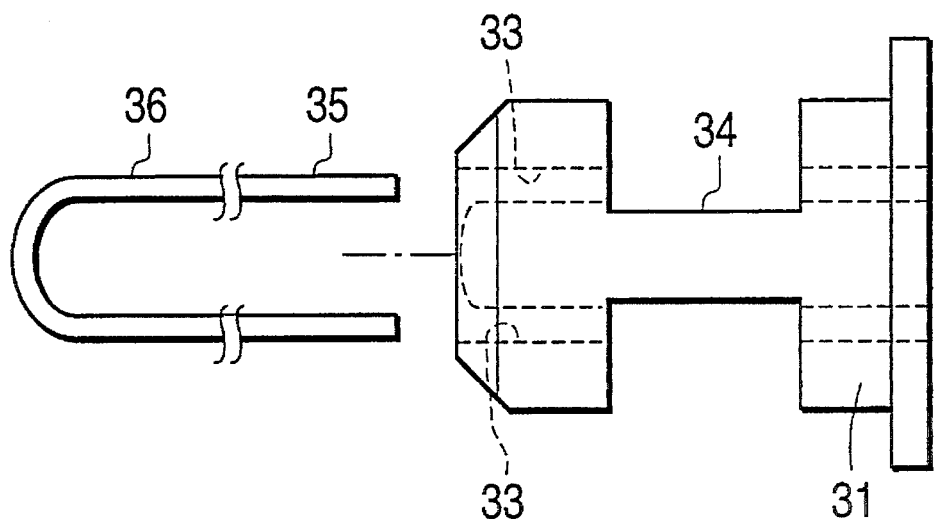
FIG. 9 is a side view of the second embodiment of the probe prior to assembly.

FIGS. 7–9 illustrate a second embodiment of the invention. The holder 31 of the probe 30 is formed of electrically insulative synthetic resin and has two insertion apertures 33 each opening at the front and rear end surfaces thereof. Two notches 34 are formed in the outer periphery of the holder 31. The insertion apertures 33 also open to front and rear inner surfaces the holder 31 defining the front and rear ends of the notches, respectively.

The conducting wire 35 is inserted into the insertion apertures 33 and passes through the two notches 34, extending out from the rear end surface of the holder 31. The U-shaped portion 36 of the conducting wire 35 is caused to abut against the front end surface of the holder 31 such that it projects from the front end surface of the holder 31.

The falling-out preventing member 37 comprises a synthetic resin and is formed by insert molding. More specifically, the conducting wire 35 is inserted through the holder 31 formed of the synthetic resin. The conducting wire 35 is pulled backward so as to be tensioned within the holder 31. In this state, the holder 31 is set in a mold. Each notch 34 is then filled with synthetic resin. Consequently, a pair of discrete falling-out preventing members 37 are integrated with the holder 31 and the conducting wire 35 is secured to the falling-out preventing members 37.

In the above-described probe 30, the conducting wire 35 is secured to the falling-out preventing members 37 integral with the holder 31 under the condition in which it is tensioned in the holder 31. Accordingly, the U-shaped portion 36 of the conducting wire 35 can be accurately positioned, which allows the wear of the brake pad to be detected with a high degree of accuracy. Furthermore, since the falling-out preventing members 37 to which the conducting wire 35 is secured are integral with the holder 31, the conducting wire 35 can be prevented from falling out of the holder 31 when the conducting wire 35 is severed. Consequently, the conducting wire 35 can reliably be prevented from coming into contact with or twining around the rotor or the axle of the automobile.

Although two notches 34 are formed and the falling-out preventing members are insert molded in each of the notches 34 in the second embodiment, a single notch and a single falling-out preventing member may be employed instead.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

What is claimed is:

1. The combination of a lining having a predetermined thickness, and a probe for detecting wear of the lining, said probe comprising: a holder mounted to the lining, said holder having proximal and distal ends, apertures extending between said ends in the direction of thickness of the lining, and at least one notch extending from the outer periphery of the holder and intersecting said apertures so as to divide said apertures into front and rear portions on opposite sides of said notch, respectively; an electrical conducting wire having a U-shaped portion abutting the distal end of said holder and two ends extending through said apertures, respectively, and being non-fixedly mounted in at least said front portions of said apertures, the electrical conducting wire protruding at said U-shaped portion thereof from said holder; and a falling-out preventing member secured to said electrical conducting wire within each said at least one notch.

2. The combination of a lining and a probe as claimed in claim 1, wherein said falling-out preventing member comprises a piece of sheet metal crimped to each of the ends of said conducting wire within said at least one notch.

3. The combination of a lining and a probe as claimed in claim 2, and further comprising a support on which the lining is mounted, and wherein said holder has a flange at the proximal end thereof, said flange being mounted to said support.

4. The combination of a lining and a probe as claimed in claim 1, and further comprising a support on which the lining is mounted, and wherein said holder has a flange at the proximal end thereof, said flange being mounted to said support.

5. The combination of a lining and a probe as claimed in claim 1, wherein said falling-out preventing member comprises a block of resin filling each said at least one notch in the holder and integrated with but discrete from said holder, the block in said at least one notch covering and fixedly mounting the ends of the conducting wire located in said at least one notch.

6. The combination of a lining and a probe as claimed in claim 5, and further comprising a support on which the lining is mounted, and wherein said holder has a flange at the proximal end thereof, said flange being mounted to said support.

7. A method of making a probe for detecting wear of a lining, said method comprising the steps of:

forming a holder having proximal and distal ends, apertures extending between said ends, and at least one notch extending from the outer periphery of the holder and intersecting said apertures so as to divide said apertures into front and rear portions on opposite sides of said at least one notch, respectively;

folding an electrical conducting wire and inserting two ends of the folded wire into the apertures of said holder so that the electrical conducting wire is non-fixedly mounted in at least said front portions of said apertures respectively, from said distal end thereof, and through said at least one notch of the holder, and leaving a portion of the wire where the wire is folded at a position disposed outwardly of the holder at the distal end of the holder; and securing ends of the electrical conducting wire, located in said at least one notch, to at least one falling out preventing member provided in said at least one notch and mounted to prevent said wire from coming out of said holder when said portion of wire disposed outwardly of the holder at the distal end of the holder is severed.

8. A method of making a probe as claimed in claim 7, wherein the step of securing comprises crimping a piece of sheet metal to said two portions of the electrical conducting wire located in said at least one notch in a manner that tensions the wire between said two portions thereof and the portion of the wire disposed outwardly of the holder at the distal end of the holder.

9. A method making a probe as claimed in claim 7, wherein the step of securing comprises covering said two portions of the electrical conducting wire located in said at least one notch with resin.

10. A detecting probe comprising:

a holder having proximal and distal ends, apertures extending between said ends, and at least one notch extending from the outer periphery of the holder and intersecting said apertures so as to divide said apertures into front and rear portions on opposite sides of said at least one notch, respectively;

an electrical conducting wire having a U-shaped portion abutting the distal end of said holder and two ends extending through said apertures, respectively, and being non-fixedly mounted in at least said front portion of said apertures, the electrical conducting wire protruding at said U-shaped portion thereof from said holder; and a falling-out preventing member secured to said conducting wire within said at least one notch.

11. A detecting probe as claimed in claim 10, wherein said falling-out preventing member comprises a piece of sheet metal crimped to each of the ends of said conducting wire within said at least one notch.

12. A detecting probe as claimed in claim 10, wherein said falling-out preventing member comprises a block of resin filling each said at least one notch in the holder and integrated with but discrete from said holder, the block in said at least one notch covering and fixedly mounting the ends of the conducting wire located in said at least one notch.

* * * * *